United States Patent [19]

Authier

[11] Patent Number: 5,416,670
[45] Date of Patent: May 16, 1995

[54] WATERCRAFT NAVIGATION LIGHT SYSTEM

[76] Inventor: Ricky J. Authier, 11304 110th Ave. East, Puyallup, Wash. 98374

[21] Appl. No.: 177,533

[22] Filed: Jan. 5, 1994

[51] Int. Cl.⁶ .................................................. F21K 2/06
[52] U.S. Cl. ...................... 362/34; 362/83.3; 362/418; 114/343; 340/321; 340/984
[58] Field of Search .............. 340/321, 984, 985; 114/343; 116/202, 206, DIG. 43; 362/34, 61, 80, 83.3, 374, 413, 418, 424, 431, 449, 450; 220/339, 356

[56] References Cited

U.S. PATENT DOCUMENTS

| | | | |
|---|---|---|---|
| 892,572 | 7/1908 | Atlee | 340/984 |
| 994,499 | 6/1911 | Bowen | 340/984 |
| 3,829,678 | 8/1974 | Holcombe | 362/34 |
| 3,875,602 | 4/1975 | Miron | 362/34 |
| 4,091,444 | 5/1978 | Mori | 362/374 |
| 4,290,043 | 9/1981 | Kaplan | 340/984 |
| 4,713,219 | 12/1987 | Gerken et al. | 220/339 |
| 4,856,452 | 8/1989 | Pingel et al. | 114/343 |
| 4,916,581 | 4/1990 | Authier | 362/34 |
| 5,190,366 | 3/1993 | World | 362/34 |

*Primary Examiner*—Ira S. Lazarus
*Assistant Examiner*—Alan B. Cariaso
*Attorney, Agent, or Firm*—David P. Campbell

[57] ABSTRACT

A watercraft navigational light system including a red and green bow light (10) and a white rear light (12). The red bow light (15) is for positioning to illuminate port side of the watercraft (14), and the green bow light (16) is for positioning to illuminate starboard side of the watercraft (14). The white rear light (12) is for positioning aft of the bow light (10). The lights (10, 12) each include a chemiluminescent light source having a chemiluminescent substance and a translucent container for encapsulating the chemiluminescent substance.

12 Claims, 2 Drawing Sheets

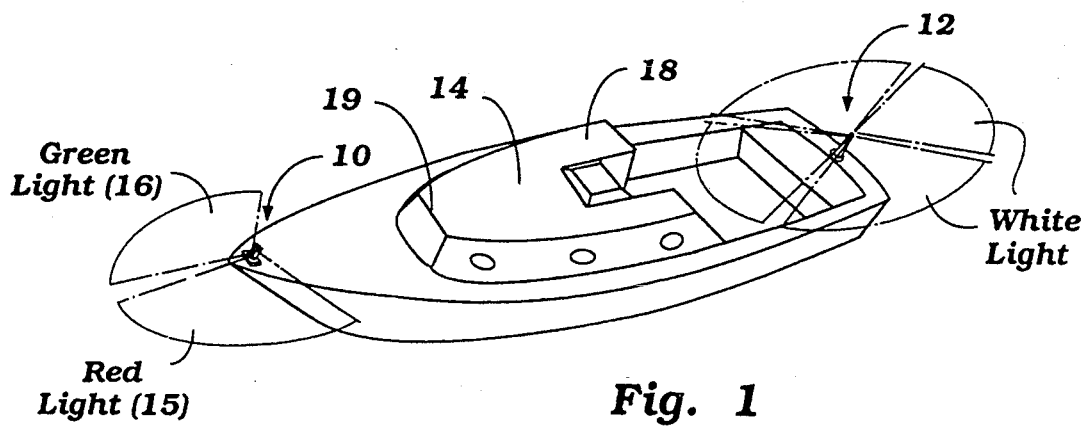
Fig. 1
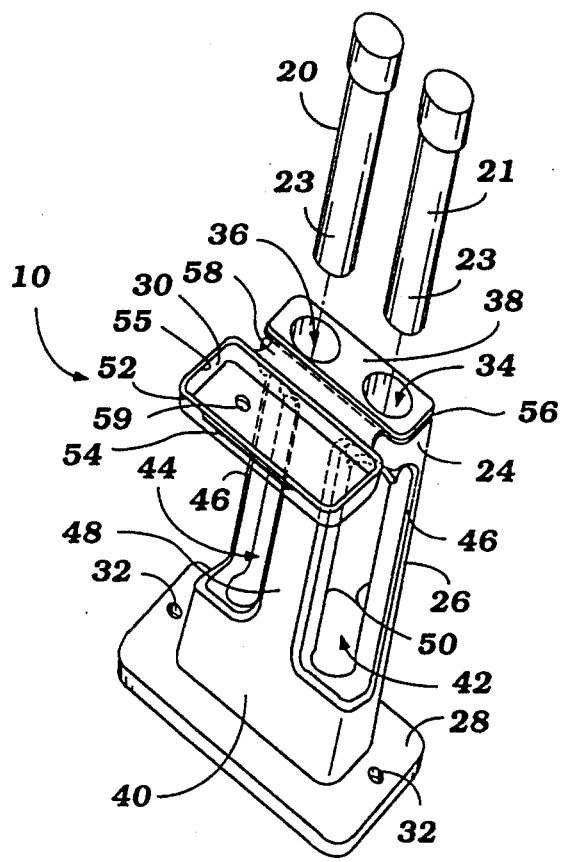
Fig. 2
Fig. 3

WATERCRAFT NAVIGATION LIGHT SYSTEM

TECHNICAL FIELD

This invention pertains to watercraft navigation lights. More particularly, this invention relates to red, green, and white navigation lights required by Coast Guard regulations.

BACKGROUND INFORMATION

U.S. Coast Guard Navigation Rules, International-Inland require sea vessels to display navigational lights between sunset and sunrise and during other periods of reduced visibility, such as fog, rain, and haze. For many types of vessels, such as recreational power-driven and sailing vessels, Coast Guard regulations require a red and green light at the bow of the vessel, and a white light either at the stern of the vessel or otherwise positioned aft of the red and green light. The red light should illuminate port side of the vessel, the green light starboard, and the white light should be positioned at a certain height and illuminate 360 degrees.

For many boats, these navigational lights are installed and hard-wired during manufacture of the boats. Some boats do not have any lights installed on them at all, such as small boats, dinghies, and rafts. Even for boats having hard-wired navigational lights, such lights are subject to electrical failure and physical damage.

Fulton Industries, Inc. of Wauseon, Ohio, U.S.A., proposes a solution to these potential problems by means of battery-powered red, green, and white marine light cartridges. The cartridges resemble flash lights and come with suction cups or clamps for mounting the lights at appropriate locations on a boat.

The present invention is a simpler, potentially less expensive alternative to the navigational lights provided by Fulton Industries, Inc.

DISCLOSURE OF THE INVENTION

Briefly described, the present invention comprises a watercraft navigational light system including a red and green bow light, and a white rear light. The red bow light is positioned to illuminate port side of the watercraft, and the green bow light is positioned to illuminate starboard side of the watercraft. The white rear light is positioned aft of the bow lights. All lights are adapted to comply with Coast Guard watercraft lighting regulations.

The bow and rear lights each include a chemiluminescent light source having a chemiluminescent substance, and a translucent container for encapsulating the chemiluminescent substance. The lights also include a housing for carrying the chemiluminescent light source. The housing includes a chamber for receiving the chemiluminescent light source, an opening for inserting and removing the chemiluminescent light source into and from the chamber, a side opening for exposing the translucent container to the exterior of the housing, and a mounting device for securing the housing to the vessel.

Preferably, the housing of the white rear light includes a telescoping section that allows the chemiluminescent light source of the white rear light to be height adjusted relative to the water level.

According to an aspect of the invention, the housings for the red and green bow lights comprise a single common housing having separate chambers for each red and green chemiluminescent light source.

According to another aspect of the invention, each housing includes a closure member for closing the opening in the housing upon insertion of the chemiluminescent light source. The closure member includes a lock mechanism for securing the closure member in its closed position and a connector for retaining the closure member when the closure member is in an open position.

According to another aspect of the invention, the connector includes a hinge pivotally securing the closure member to the housing. The closure member also includes a transparent portion for exposing one of the red and green chemiluminescent light sources.

According to another aspect of the invention, the mounting device includes a mechanical hook-and-loop type fastener.

These and other advantages and features will become apparent from the following detailed description of the best mode for carrying out the invention and the accompanying drawings, and the claims, which herein are incorporated by reference as part of the disclosure of the invention.

BRIEF DESCRIPTION OF THE DRAWINGS

Like reference numerals refer to like parts throughout the several views, wherein:

FIG. 1 is a pictorial view of a watercraft having the navigation light system of the present invention installed thereon;

FIG. 2 is a pictorial view of the red and green bow light of the navigation light system of FIG. 1;

FIG. 3 is a pictorial view of the white rear light of the navigation light system of FIG. 1;

BEST MODE FOR CARRYING OUT THE INVENTION

Figures 4, 5:
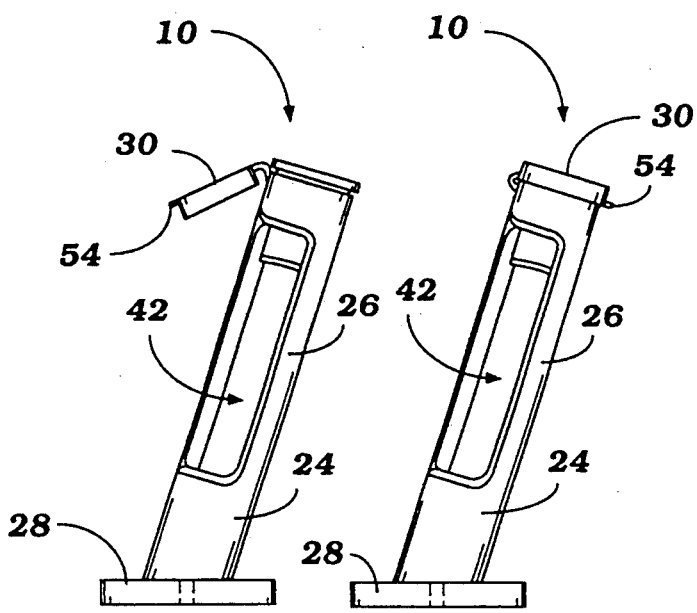
FIG. 4 is a side elevation view of the red and green bow light of FIG. 2, shown with its closure member in an open position.
FIG. 5 is a view like FIG. 4, shown with the closure member in its closed position.

Referring now to the drawings, in FIG. 1, the navigation light system of the present invention is shown to include a red and green bow light 10 and a white rear light 12. The red and green bow light 10 is mounted at the bow of a watercraft, such as a boat 14. The white rear light 12 is mounted at the stern of boat 14. The red and green bow light 10 includes separate red 15 and green 16 lights, wherein the red light 15 is positioned on light 10 so as to illuminate port side and in front of boat 14, and the green light 16 is positioned to illuminate starboard side and in front of boat 14. The white rear light 12 includes a white light that illuminates 360 degrees about the boat 14. The light pattern illustrated in FIG. 1 is in accordance with United States Coast Guard navigation rules, international-inland encompassing lighting requirements for power driven and sailing vessels less than twenty meters in length. It is not intended that application of the present invention be limited to vessels less than twenty meters in length. The navigation light system of the present invention could be used on any length boat.

The white rear light 12, alternatively, could be positioned at other locations on boat 14 so long as the white light 12 is positioned behind the red and green light 10 a minimum distance. For example, the white rear light 12 could be positioned atop the cabin 18 or front windshield 19 and could be positioned atop a pole, which would elevate the white rear light well above the main body of boat 14, as well as above the red and green light 10.

As shown in FIGS. 2 and 3, each bow light 10 and rear light 12 include a chemiluminescent light source 20, 21, 22. Each chemiluminescent light source 20, 21, 22 includes a chemiluminescent substance and a translucent container 23 for encapsulating the chemiluminescent substance (not shown). Each chemiluminescent light source is referred to as a "light stick." Light stick 20 is green, light stick 21 is red, and light stick 22 is white. The light sticks 20, 21, 22 are generally well known in the art, and my prior U.S. Pat. No. 4,916,581, issued Apr. 4, 1990, and patent application Ser. No. 101,936, filed Aug. 4, 1993, now U.S. Pat. No. 5,381,312 provide a more detailed description of these light sticks. The light sticks used for the present invention are manufactured by Omniglow Corporation, Novato, Calif., U.S.A.

Generally, these light sticks include an inner tube encapsulating a first chemical and a second chemical contained between the outer shell and the inner tube. The sticks are flexible, so that upon bending, the inner tube ruptures, and the two chemicals mix and create an illuminating chemical reaction.

Each bow light 10 and rear light 12 includes a housing for carrying the chemiluminescent light sticks 20, 21, 22. In the preferred embodiment, the housings for the red and green bow lights 10 comprises a single housing 24, as shown in FIG. 2. Housing 24 includes a chamber 26, a mounting bracket 28, and a closure member or lid 30. Mounting bracket 28 is a generally flat, rectangular piece having a pair of openings 32 for receiving fasteners to secure housing 24 to a substantially level section at the bow of boat 14. Alternatively, however, the underside of mounting bracket 28 could be provided with a Velcro-type mechanical fastener, with the bow section of boat 14 being provided with a corresponding Velcro-type fastener. With Velcro-type fasteners, the lights 10, 12 can be stored in a compartment within boat 14, and removed and mounted in position relatively quickly and easily when needed. With mechanical fasteners, such as bolts or screws, the housings 24 are permanently positioned about boat 14, and only the light sticks 20, 21, 22 are kept stored in the boat and removed and inserted into the housings when needed.

Chamber 26 is an elongated, rectangular light stick holder having a first compartment 34 and a second compartment 36. Compartments 34 and 36 are bored through chamber 26 from its top 38 down through and into its lower region 40. Compartments 34, 36 are sized slightly larger than the cross-sectional dimensions of light sticks 20, 21. Chamber 26 is provided with a pair of elongated sidewall openings 42, 44. Each opening 42, 44 is positioned at a front corner of chamber 26 and extends through a portion of the sides 46 and front 48 of chamber 26. The inner edge 50 of sidewall openings 42, 44 are spaced from each other a distance less than the cross-sectional dimension of light sticks 20, 21, 22, so as to prevent the light sticks from escaping out sidewall openings 42, 44. Sidewall openings 42, 44 allow light sticks 20, 21 to illuminate to the sides and to the front of boat 14. Chamber 26 is secured to mounting bracket 28 by any suitable mean, such as screws.

Lid 30 is rectangular in shape and includes a rim 52 and a tab 54 extending outwardly along a portion of the length of one side of rim 52. Rim 52 allows lid 30 to fit over the top 38 of chamber 26 and, thereby, close compartments 34, 36. Rim 30 has an inwardly-projecting edge 55, and the perimeter of top 38 of chamber 26 has a corresponding outwardly-projecting edge 56. Edges 54, 56 provide an interference fit for holding lid 30 in a closed position covering chambers 34, 36. Lid 30 includes a see-through opening or transparent portion 59. Opening 59 is positioned to over-lie compartment 36 upon closing lid 30. Opening 59 provides an indication to a user upon inserting light sticks and closing lid 30 if the red and green sticks were placed in the correct compartments, specifically, if the green light stick was properly installed. Lid 30 also includes a flexible connector 58 for retaining lid 30 when the lid is in its open position, as shown in FIG. 2. The back side (not shown) of chamber 26 does not include any openings for exposing the light sticks 20, 21 to the rear of the boat 14.

As shown in FIG. 3, the white rear light 12 includes a mounting bracket 62, a chamber 64 and a closure member or lid 66. Mounting bracket 62 includes a pair of holes 68 for receiving a fastener to secure light 12 to a substantially level section of the rear portion of boat 14. As with light 10, light 12 can be provided with a Velcro-type fastener on the underside of mounting bracket 62, with a corresponding Velcro-type fastener provided on the rear section of the boat 14.

Chamber 64 is generally circular in shape and includes a series of elongated, rounded sidewall openings 70 positioned around the circumference of chamber 64. Chamber 64 also includes a central compartment 72 extending all the way through chamber 64 to its lower region 74. The dimensions of compartment 72 are slightly larger than the dimensions of light stick 22, so that light stick 22 can be inserted into compartment 72 with minimum effort. Sidewall openings 70 are sized smaller than the dimensions of light stick 22 so as to prevent light stick 22 from escaping through sidewall openings 70. Sidewall openings 70 expose light stick 22 in a 360 degree arc about chamber 64. Lid 66 is provided with a rim 76 having an inwardly-projecting edge 78 and a tab 80 for opening lid 66. A flexible connector 82 connects lid 66 to the top 84 of chamber 64. Top 84 includes an outwardly-projecting edge 86 that provides an interference fit with edge 78 of lid 66 when lid 66 is closed over the top 84 of chamber 64.

Preferably, housings 24, 64 of lights 10, 12 are made of a structural plastic material or other suitable non-corroding material that also floats. In addition, light sticks 20, 21, 22 should also be made of a material that floats. Flotation allows the components to be retrieved should they be dropped in the water.

FIGS. 4 and 5 show the red and green light 10 in an open and closed position, respectively. The chamber 26 is angled slightly with respect to mounting bracket 28. Housing 24 is mounted to the boat with chamber 26 angled rearwardly, away from the forward direction of movement of the boat. Lid 30 is mounted to the upwardly-inclined, front side of chamber 26 so that when light 10 is positioned with sidewall openings 42, 44 (opening 44 not shown) facing forwardly of boat 14, the tab 54 of lid 30 is positioned away from onrushing air. In this configuration, wind moving past the boat will not force open lid 30 by acting upwardly against tab 54.

Figure 6:
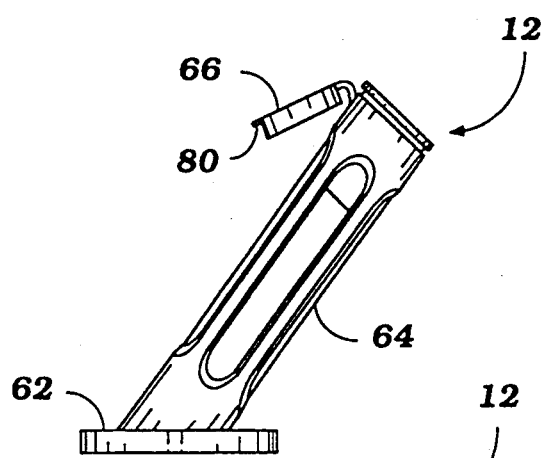
FIG. 6 is a side elevation view of the white rear light of FIG. 3, shown with its closure member in an open position.
Figure 7:
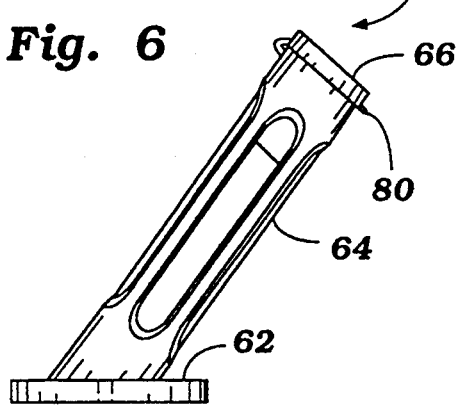
FIG. 7 is a view like FIG. 6, shown with its closure member in a closed position.

FIGS. 6 and 7 show the lid 66 of the white rear light 12 in an open and closed position, respectively. Like the red and green bow light 10, the chamber 64 of light 12 is angled with respect to mounting bracket 62. Light 12 is adapted to be mounted to the rear section of boat 14 so that the chamber 64 angles to the rear of the boat. The lid 66 is mounted to the forwardly-facing, upwardly-inclined front side of chamber 64 so that the tab 80 is positioned behind chamber 64 and is blocked from air moving past the boat.

Figure 8:
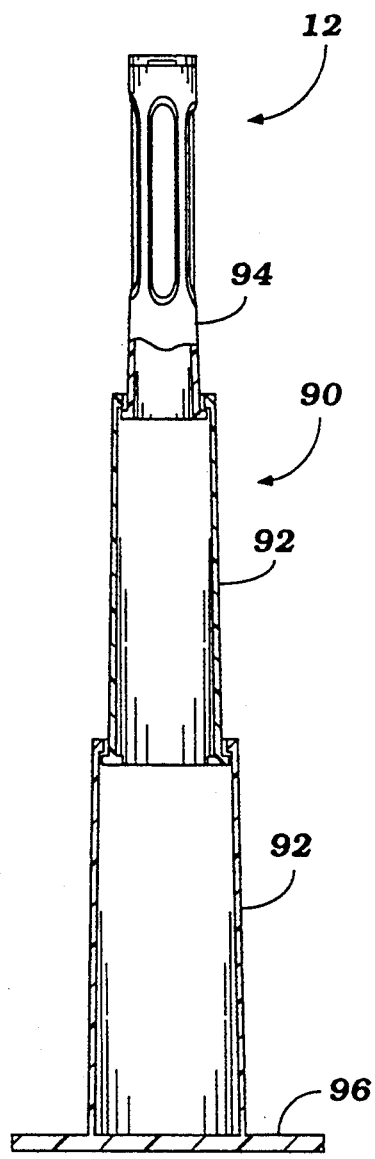
FIG. 8 is a side elevation view shown partially in section of an alternative embodiment for the white rear light of the present invention.

FIG. 8 illustrates an alternative embodiment for the white rear light 12. As shown in FIG. 8, the white rear light 12 may include a telescoping section 90 including a plurality of sections 92 and a top section 94 constructed similar to the first embodiment of light 12 shown in FIGS. 3, 6, and 7. The mounting bracket 96 of telescoping white rear light 12 is similar to mounting bracket 62 of the white light of the first embodiment and can be attached by bolts or screws or Velcro-type fasteners or the like to the rear section of the boat. The telescoping sections 92 of light 12 allow light 12 to be height adjustable relative to the water level, which height is prescribed by Coast Guard regulations.

With the navigation light system of the present invention, when it is necessary for a boat or any type of watercraft to display red, green and white navigation lights, the light sticks can be quickly gathered, activated, and inserted into their respective housings and secured therein. The light sticks illuminate for approximately six to eight hours, which should be sufficient time for most situations. However, if it is necessary to use the navigation light system of the present invention for longer than six to eight hours, additional light sticks can be activated and replace the previously-spent light sticks.

The present invention is particularly useful for boats that are not equipped with an installed electrical navigation light system, such as small boats, dinghies, and many types of rafts. For these boats, the present invention provides a relatively inexpensive means for complying with Coast Guard regulations. For boats with pre-installed electrical navigation light systems, the present invention can still be useful should the electrical systems of these boats fail or become damaged.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently described and illustrated embodiment is non-limitive and is for illustration only. Instead, my patent is to be limited for this invention only by the following claim or claims interpreted according to accepted doctrines of claim interpretation, including the doctrine of equivalence and reversal of parts.

What is claimed is:

1. A watercraft navigational light system for a vessel, comprising:
   a red and green bow light, and
   a white rear light,
   the red bow light for positioning to illuminate port side of the watercraft and the green bow light for positioning to illuminate starboard side of the watercraft, the white rear light for positioning aft of the bow lights, all lights adapted to comply with United States Coast Guard watercraft lighting regulations;
   the bow and rear lights each including a chemiluminescent light source having a chemiluminescent substance and a translucent container for encapsulating the chemiluminescent substance, and a housing for carrying the chemiluminescent light source, the housing including a chamber for receiving the chemiluminescent light source, an opening for inserting and removing the chemiluminescent light source into and from the chamber, a sidewall opening for exposing the translucent container to the exterior of the housing, and a mounting device for securing the housing to the watercraft;
   wherein the housings for the red and green bow lights comprise a single common housing for each red and green chemiluminescent light source.

2. The watercraft navigational light system of claim 1, wherein the housing of the white rear light includes a telescoping section that allows the chemiluminescent light source of the white rear light to be height adjusted relative to the water level.

3. The watercraft navigational light system of claim 1, wherein the housings for the red and green bow lights comprise a single common housing having separate chambers for each red and green chemiluminescent light source.

4. The watercraft navigational light system of claim 1, wherein each housing includes a closure member for closing the opening in the housing upon insertion of the chemiluminescent light source, the closure member including a lock mechanism for securing the closure member in its closed position and an attachment mechanism for retaining the closure member when the closure member is in an open position.

5. The watercraft navigational light system of claim 4, wherein the attachment mechanism includes a hinge pivotally securing the closure member to the housing.

6. The watercraft navigational light system of claim 4, wherein the closure member includes a transparent portion for exposing one of the red and green chemiluminescent light sources.

7. The watercraft navigational light system of claim 1, wherein the mounting device includes a mechanical hook-and-loop type fastener.

8. The watercraft navigational light system of claim 1, wherein the red bow light is adapted to be positioned at the bow of the vessel so that it is exposed at the front and to the port side of the vessel, the green bow light is adapted to be positioned at the bow of the vessel so that it is exposed at the front and to the starboard side of the vessel, and the white stern light is adapted to be positioned at the stern of the vessel so that it is exposed 360 degrees about the vessel.

9. The watercraft navigational light system of claim 1, wherein the housings are made of a material that floats in water.

10. The watercraft navigational light system of claim 6, wherein the transparent portion exposes only one of the red and green chemiluminescent light sources.

11. A watercraft navigational light system for a vessel, comprising:
    a red and green bow light, and
    a white rear light,
    the red bow light for positioning to illuminate port side of the watercraft and the green bow light for positioning to illuminate starboard side of the watercraft, the white rear light for positioning aft of the bow lights, all lights adapted to comply with United States Coast Guard watercraft lighting regulations;

the bow and rear lights each including a chemiluminescent light source having a chemiluminescent substance and a translucent container for encapsulating the chemiluminescent substance, and a housing for carrying the chemiluminescent light source, the housing including a chamber for receiving the chemiluminescent light source, an opening for inserting and removing the chemiluminescent light source into and from the chamber, a sidewall opening for exposing the translucent container to the exterior of the housing, and a mounting device for securing the housing to the watercraft;

wherein the housings for the red and green bow lights comprise a single common housing having separate chambers for each red and green chemiluminescent light source.

12. A watercraft navigational light system for a vessel, comprising:

a red and green bow light, and a white rear light, the red bow light for positioning to illuminate port side of the watercraft and the green bow light for positioning to illuminate starboard side of the watercraft, the white rear light for positioning aft of the bow lights, all lights adapted to comply with United States Coast Guard watercraft lighting regulations;

the bow and rear lights each including a chemiluminescent light source having a chemiluminescent substance and a translucent container for encapsulating the chemiluminescent substance, and a housing for carrying the chemiluminescent light source, the housing including a chamber for receiving the chemiluminescent light source, an opening for inserting and removing the chemiluminescent light source into and from the chamber, a sidewall opening for exposing the translucent container to the exterior of the housing, and a mounting device for securing the housing to the watercraft;

wherein each housing includes a closure member for closing the opening in the housing upon insertion of the chemiluminescent light source, the closure member including a lock mechanism for securing the closure member in its closed position and an attachment mechanism for retaining the closure member when the closure member is in an open position; and wherein the closure member includes a transparent portion for exposing one of the red and green chemiluminescent light sources.

* * * * *